(12) United States Patent
Galipeau et al.

(10) Patent No.: US 6,308,283 B1
(45) Date of Patent: *Oct. 23, 2001

(54) REAL-TIME DATA PROTECTION SYSTEM AND METHOD

(75) Inventors: Kenneth J. Galipeau, Randolf; Winston Edward Lee, Somerset, both of NJ (US)

(73) Assignee: Legato Systems, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/074,982

(22) Filed: May 8, 1998

Related U.S. Application Data

(63) Continuation of application No. 08/489,198, filed on Jun. 9, 1995, now Pat. No. 5,799,141.

(51) Int. Cl.$^7$ .......................... H02H 3/05; H03K 19/003

(52) U.S. Cl. .................................. 714/6; 714/13; 714/11

(58) Field of Search .................................. 714/6, 7, 8, 11, 714/13; 711/162, 168

(56) References Cited

U.S. PATENT DOCUMENTS

| | | | |
|---|---|---|---|
| 5,086,502 | * | 2/1992 | Malcolm ................................. 714/8 |
| 5,133,065 | * | 7/1992 | Cheffetz et al. ........................ 714/2 |
| 5,212,784 | * | 5/1993 | Sparks .................................... 714/6 |
| 5,276,860 | * | 1/1994 | Fortier et al. .......................... 714/6 |
| 5,454,099 | * | 9/1995 | Myers et al. ........................... 714/6 |
| 5,495,607 | * | 2/1996 | Pisello et al. ......................... 707/10 |
| 5,513,314 | * | 4/1996 | Kandasamy et al. .................. 714/6 |
| 5,544,347 | * | 8/1996 | Yanai et al. .......................... 711/162 |
| 5,799,141 | * | 8/1998 | Galipeau et al. ..................... 714/13 |

* cited by examiner

*Primary Examiner*—Dieu-Minh Le
(74) *Attorney, Agent, or Firm*—Workman, Nydegger & Seeley

(57) ABSTRACT

A system and method for providing substantially concurrent mirroring of files across a network. A data file is selected for mirroring on a local computer system and one or more remote computer systems are designated to store a back-up copy of the selected data file. As changes to the selected data file occur, change information is captured by a mirroring driver, which is attached to the file system driver, and then forwarded from the local computer system across the network to the remote computer system or systems. Each remote computer system then updates the back-up copy of the data file.

17 Claims, 7 Drawing Sheets

REAL-TIME DATA PROTECTION SYSTEM AND METHOD

CROSS REFERENCE TO RELATED APPLICATION

This is a continuation of application Ser. No. 08/489,198, filed Jun. 9, 1995, now U.S. Pat. No. 5,799,141.

FIELD OF THE INVENTION

The present invention relates to a system and method for providing real-time protection of data on computer systems connected to a network.

BACKGROUND OF THE INVENTION

There are several known methods for protecting computer data. One such method is to perform periodic batch back-ups of either an entire hard disk drive or selected files on a hard disk drive. Typically files may be selected based upon a file directory tree or other criteria, such as hard-coded filenames or filenames with wildcard characters. The data is typically written to a large capacity storage device, such as a tape-drive, connected directly to the computer system. Some batch back-up systems, however, such as the system described in U.S. Pat. No. 5,133,065, permit data on computers connected to a computer network to be backed-up onto a centralized back-up device on the network. Where batch back-ups are used, it is usually recommended that disk-wide back-ups of data be performed infrequently, such as monthly, and that back-ups of new or modified files be performed frequently, such as daily.

A disadvantage of batch back-up systems is that the stored data is often out of date. Even nightly back-ups do not protect data accumulated since the last back-up. In certain businesses, such as banking and financial industries, the loss of even an hour of transactions can have serious repercussions. Another disadvantage of batch back-up systems is that typically the entire selected file is backed-up even if only a portion of the file has been modified. If the batch back-up system is operating over a network, valuable network resources are wasted transferring unchanged data.

Another known method for protecting data is to duplicate (or mirror) all data write operations occurring on a primary device onto one or more secondary (back-up) devices. In systems utilizing this method, the data storage control unit for the primary device (such as a disk controller) is directly connected to either the secondary device itself or the control unit for the secondary device.

This type of data protection has been implemented using Redundant Array Inexpensive Direct access storage device (RAID) drives. A RAID drive is in essence a package of multiple, inexpensive disk drives. Mirroring has been accomplished by configuring the RAID drive controller to write the same data to two separate disks in the RAID drive.

Mirroring techniques are also used on fault tolerant computer systems. Fault tolerant computer systems have been available for mini-computers and mainframes for years, offering survival of any single point of failure in the system. These systems, however, often require expensive, redundant hardware, additional hardware for connectivity and frequently require specialized (often proprietary) operating systems.

one disadvantage of all known real-time mirroring systems is that none provides a granularity of mirroring smaller than a disk, partition or volume set. Also, none of the known real-time mirroring systems provides for mirroring across a local or wide area network.

SUMMARY OF THE INVENTION

It is therefore an object of the present invention to provide a method and system for creating back-up copies of data files substantially concurrently with changes to those data files without using specialized hardware or operating systems.

It is a further object of the present invention to provide for back-ups at the level of individual files.

It is yet another object of the present invention to provide a back-up system that can be used with existing application programs that contain no data protection code without modification to the application programs.

The above and other objects are realized by the system and method of the present invention. Briefly, the present invention provides a data protection system that is not tied to specialized hardware or operating systems and that permits the user to specify a level of granularity of data protection down to individual files. In one preferred embodiment, a user initializes a configuration database that specifies the data files on a local system the user wishes to back-up (i.e., mirror) and the network location of a remote computer system to contain the back-up files. The system of the present invention provides a mirroring driver that is attached to the file system driver of the local computer system and intercepts operations on files (such as write operations, and delete, rename and change of attribute operations). By attaching the mirroring driver to the file system driver, the system of the present invention can mirror files accessed by existing application programs, having no data protection code, without modification to the application programs. The mirroring driver has a table with information read from the configuration database and determines if the operation is on a protected file. If it is, the mirroring driver stores information regarding the operation in a log file. A send process, which runs asynchronously from the mirroring driver, reads the log file and forwards the information regarding the operation from the local computer system across the network to the remote computer system containing the back-up file. The information is forwarded to the remote computer system using the standard methods provided by the networking software. A receive process on the remote computer system stores the information in its own log file and sends an acknowledgement to the source local computer system. A router process on the remote computer system then reads the remote. computer system's log file and applies the operations to the back-up files.

In another preferred embodiment of the invention, the local system is itself a local area network having a plurality of workstations connected to a network server.

DETAILED DESCRIPTION OF THE PREFERRED EMBODIMENTS

Figure 1:
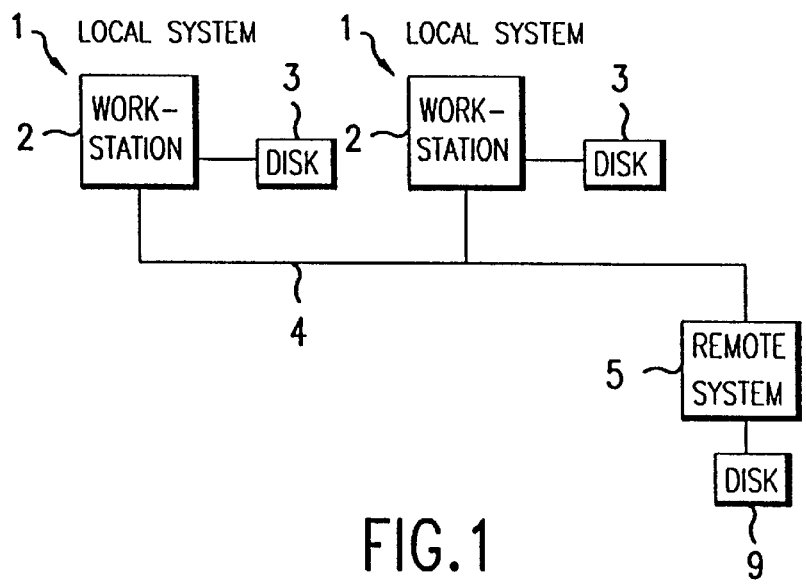
FIG. 1 is a block diagram of the real-time data protection system of a preferred embodiment of the present invention.

FIG. 1 illustrates the basic hardware setup of a preferred embodiment of the present invention. One or more local computer systems 1, each comprising a workstation 2 directly connected to a disk drive 3 or other direct access storage device (DASD), are connected to a remote computer system 5 via a network 4. Network 4 may be a local or wide area network. On each local computer system 1, workstation 2 executes application programs that read and write data residing in data files on the disk drive 3. Workstation 2 also asynchronously executes data protection software. A first data protection program intercepts each write request, sends the write request to the disk drive controller and, for write requests to selected data files, locally stores a copy of the request. A second data protection program then forwards the request over network 4 to remote computer system 5. Remote computer system 5 contains duplicate (back-up) copies of the selected data files on disk 9. Upon receipt of a write request, a program on the remote computer system 5 stores the request in a request log and then sends a confirmation message to the local computer system 1 indicating that the request has been received by the remote computer system. The data protection software on the local computer system 1, in turn, marks the write request as complete upon receipt of the confirmation message from the remote computer system 5. Another program on the remote computer system later reads the request log and updates the remote copy of the data file. As is clear from this description, multiple local computer systems can communicate with one remote computer system.

All communications between the local and remote computer systems use standard network protocols and wiring. Preferably, a Microsoft® Windows NT™ based network is used that supports Microsoft's Remote Procedure Call (RPC) interface.

Figure 2:
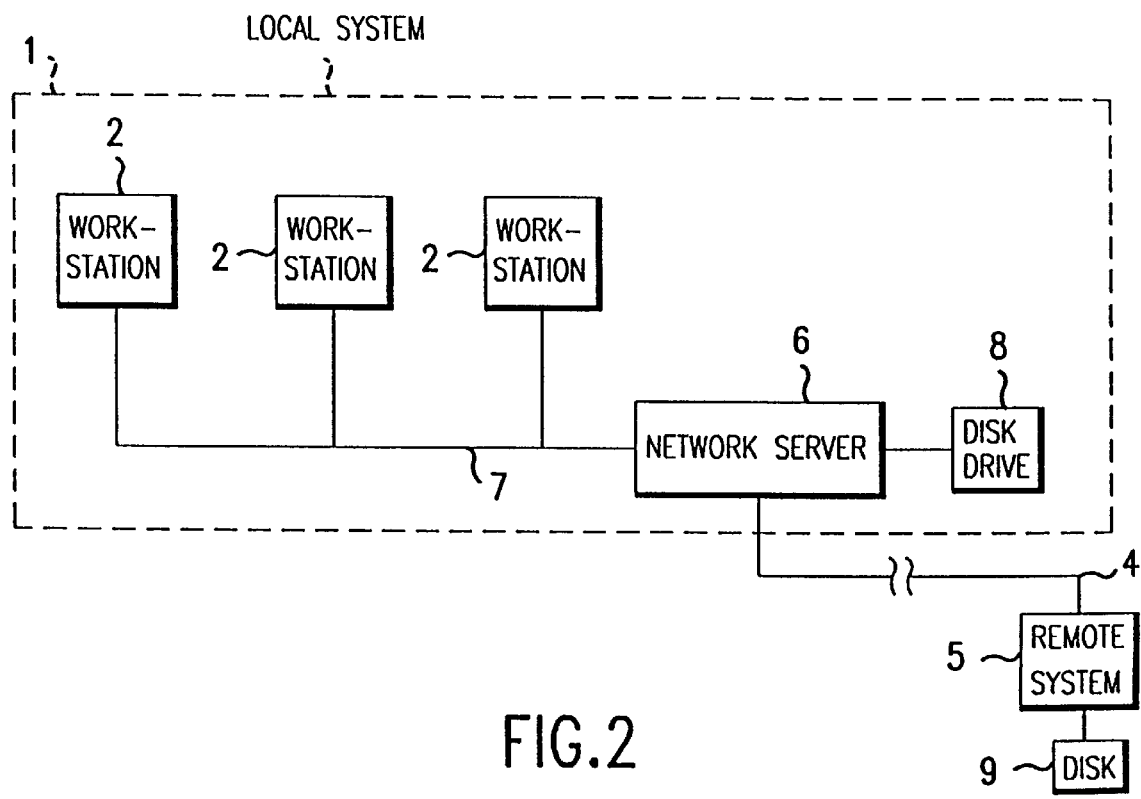
FIG. 2 is a block diagram of the real-time data protection system of another preferred embodiment of the present invention.

As shown in FIG. 2, local computer system 1 can be implemented as a local area network 7. Again, preferably a Microsoft® Windows NT™ based network is used that supports Microsoft's Remote Procedure Call (RPC) interface. In this case, workstations 2 execute application programs that read and write data in data files residing on disk drive 3 connected to network server 6. Network server 6 executes the data protection software, which intercepts and stores write requests. The data protection software also forwards write requests over local or wide area network 4 to remote computer system 5. As above, remote computer system 5 contains duplicate copies of selected files on disk 9. Upon receipt of a write request, remote computer system 5 stores the request in a request log, sends a confirmation message to network server 6 and updates its copy of the designated data file. Network server 6, in turn, marks the write request as complete upon receipt of the confirmation message from remote computer system 5.

It is also possible to implement the present invention with multiple remote computer systems. In this case, the data protection software will direct write requests to a specific remote computer system or systems. It is thus possible to create multiple back-up copies of a single data file.

The software components of the preferred embodiment of the present invention can be divided into three basic functions: setup and initialization, write intercept and store, and write forward and confirm.

Setup and Initialization

Figure 3:
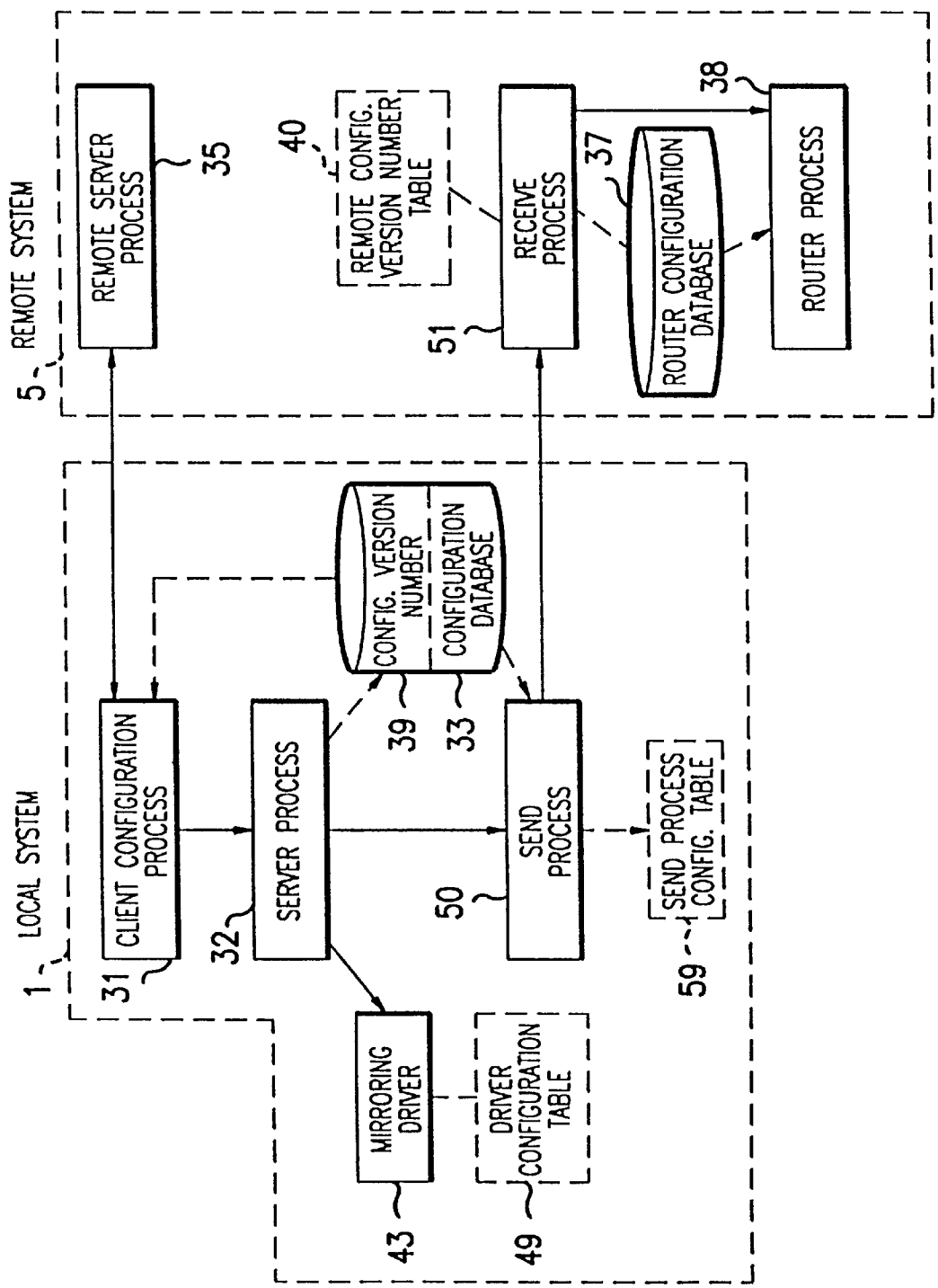
FIG. 3 is a block diagram illustrating the components of the setup and initialization function.
Figure 6:
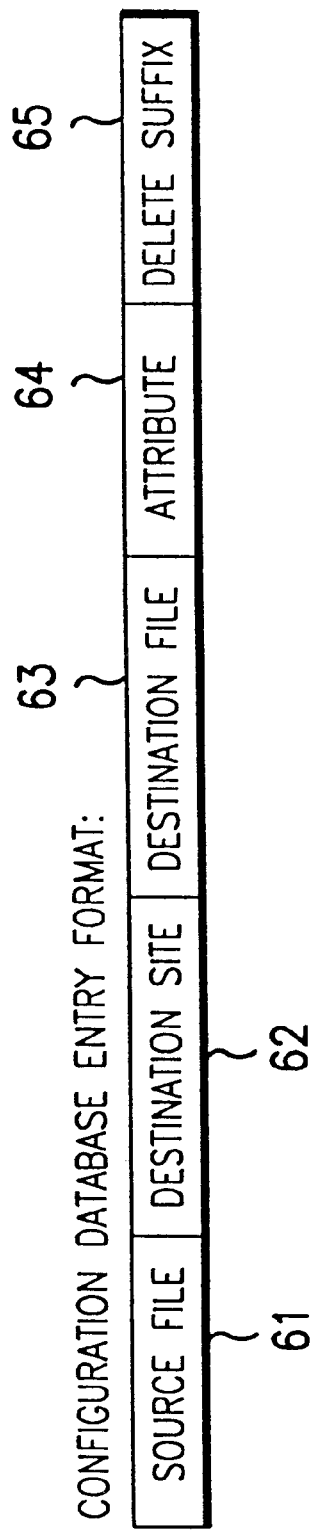
FIG. 6 illustrates a preferred format of an entry in the Configuration Database.

FIG. 3 illustrates the setup and initialization function. A client configuration process 31 and server process 32 permit the user to add, modify or delete entries in configuration database 33. Configuration database 33 specifies the files to be mirrored. As shown in FIG. 6, an entry in configuration database 33 comprises a source file field 61, a destination site field 62, a destination file field 63, an attribute field 64 and a delete suffix field 65. Source file field 61 designates the file or files to be mirrored and preferably can be in any one of the following formats:

c:\a\x.doc mirrors file c:\a\x.doc only c:\a\*.doc mirrors all files ending with '*.doc' in directory c:\a (other wildcard characters can also be used)

c:\a\mirrors all files in the c:\a subtree c:\a\*.doc\mirrors all files ending with '*.doc' in the c:\a subtree (Unless otherwise stated, references to filenames herein include the pathname.) Destination site field 62 designates the network system name of the remote computer system that will contain the back-up file or files. The destination site can also be set to designate a DASD connected to the local computer system. Mirroring to multiple destination sites is accomplished by including a separate configuration entry for each destination site. Destination file field 63 designates the name of the back-up file or directory. If destination file field 63 designates a directory, which must be the case if multiple source files are specified, then the destination files are the files within the directory (or its subtree) with the same filenames as the source files. Attribute field 64 indicates whether attributes of the file (e.g., read-only or permissions) should be mirrored. Delete suffix field 65 designates a suffix that the back-up file or files should be renamed with, instead of deleted, when the mirrored file is deleted.

Referring back to FIG. 3, the user executes client configuration process 31 on local computer system 1 to specify changes to configuration database 33. If the user modifies or adds an entry to the configuration database, client configuration process 31 checks that the designated destination site and file are valid by sending a validation request to remote computer system 5. The request is processed by remote server process 35 on remote computer system 5, which verifies whether the destination file exists and can be written to and, if the destination file does not exist, whether it can be created. The result is then returned to client configuration process 31. If the remote server process 35 validates the request, client configuration process 31 then sends the entry to local server process 32. Local server process 32 first performs validity checks on the new or modified entry such as determining whether the designated source file or files are accessible. If the entry is valid, server process 32 writes the entry to configuration database 33. Server process 32 then notifies the send process 50 and mirroring driver 43, both described below, that an entry has been added or changed so that the send process 50 and mirroring driver 43 can modify their tables to reflect the new information in its operations. (As used herein, tables refer to data stored in memory on the local and remote computer systems, as opposed to being stored, for example, on disk.)

Send process 50 performs two separate but related functions: sending configuration information to remote computer systems and sending mirrored file update information to remote computer systems. The latter function is discussed separately below.

When server process 32 notifies the send process of a change in the configuration, send process 50 increments the configuration version number 39. Configuration version number 39 identifies the latest version of the configuration database 33. Send process 50 sends configuration version number 39 and the entry to receive process 51 on the remote computer system. Receive process 51 adds the configuration version number to its remote configuration version number table 40. Each entry in remote configuration version number table 40 identifies the local machine and the latest version of the configuration database received from that machine. This information is used to ensure that the configuration information on the remote machine is in synch with the configuration information on the local machine.

Figure 9:
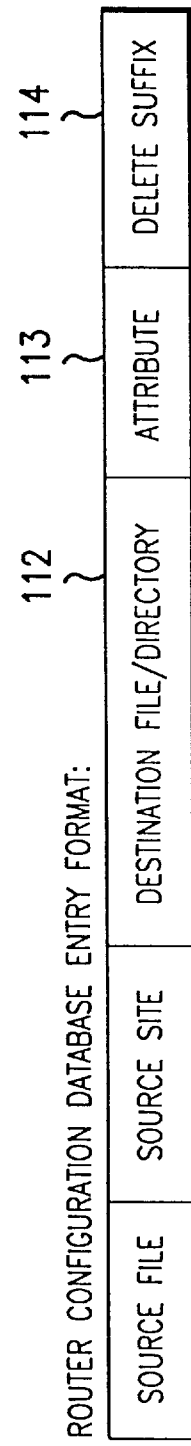
FIG. 9 illustrates a preferred format of an entry in the router configuration database.

Receive process 51 also writes the new entry to router configuration database 37. As shown in FIG. 9, an entry in the router configuration database 37 comprises a source file field 110, a source site field 111, a destination file or directory field 112, an attribute field 113 and a delete suffix field 114. All fields in the router configuration database are the same as the corresponding fields in configuration database 37, except for the source site field, which designates the local computer system from which the entry was received.

Router configuration database 37 contains all entries that designate the remote computer system as a destination site in all local computer system configuration databases. Router process 38, described in more detail below, reads the router configuration database, at startup and when instructed to by receive process 51, and updates the router configuration table, also described below.

If the user, through client configuration process 31, indicates that an entry in configuration database 33 is to be deleted, server process 32 performs the deletion and also transmits the change to mirroring driver 43. Mirroring driver 43, in turn, flags the corresponding entry in its table as deleted.

Each time the local computer system is restarted, mirroring driver 43, through server process 32, and send process 50 read configuration database 33 and create a driver configuration table 49 and a send process configuration table 59, respectively. Driver configuration table 49 contains for each source file listed in configuration database 33 the source file field and a cyclic redundancy check (CRC) based on the contents of the source file field. The CRC is used to optimize look-ups in driver configuration table 49. The calculation of a CRC is well known in the art.

Send process configuration table 59 contains for each source file listed in configuration database 33 the contents of the source file field 61, destination file field 63, attribute field 64, and delete suffix field 65, and a list of the destination sites 62 designated in each configuration database entry having the same source file. The send process also generates a CRC based on the contents of the source file field.

Write Intercept and Store

Figure 4A:
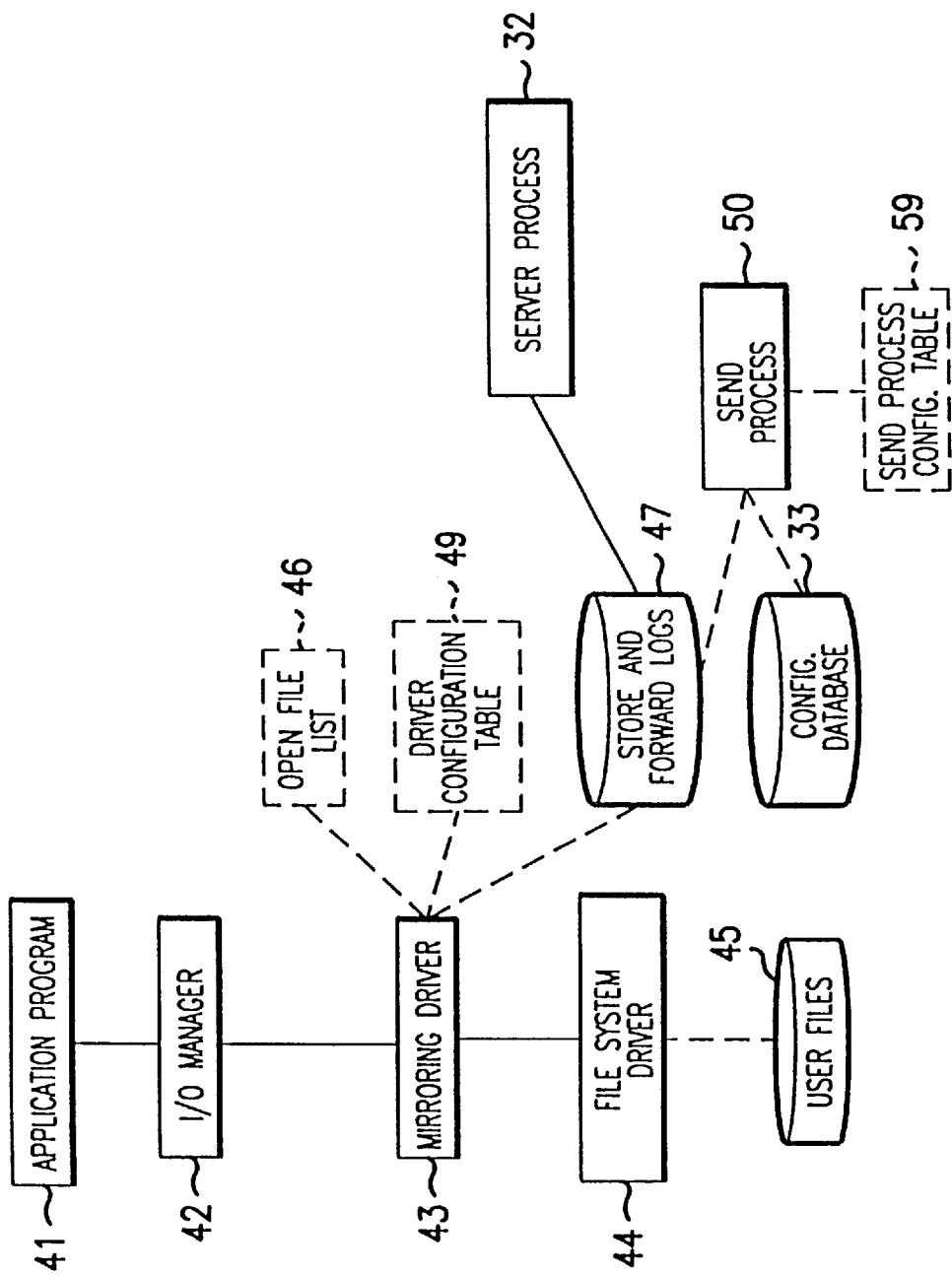
FIG. 4a is a block diagram illustrating the components of the write intercept and store function.
Figure 4B:
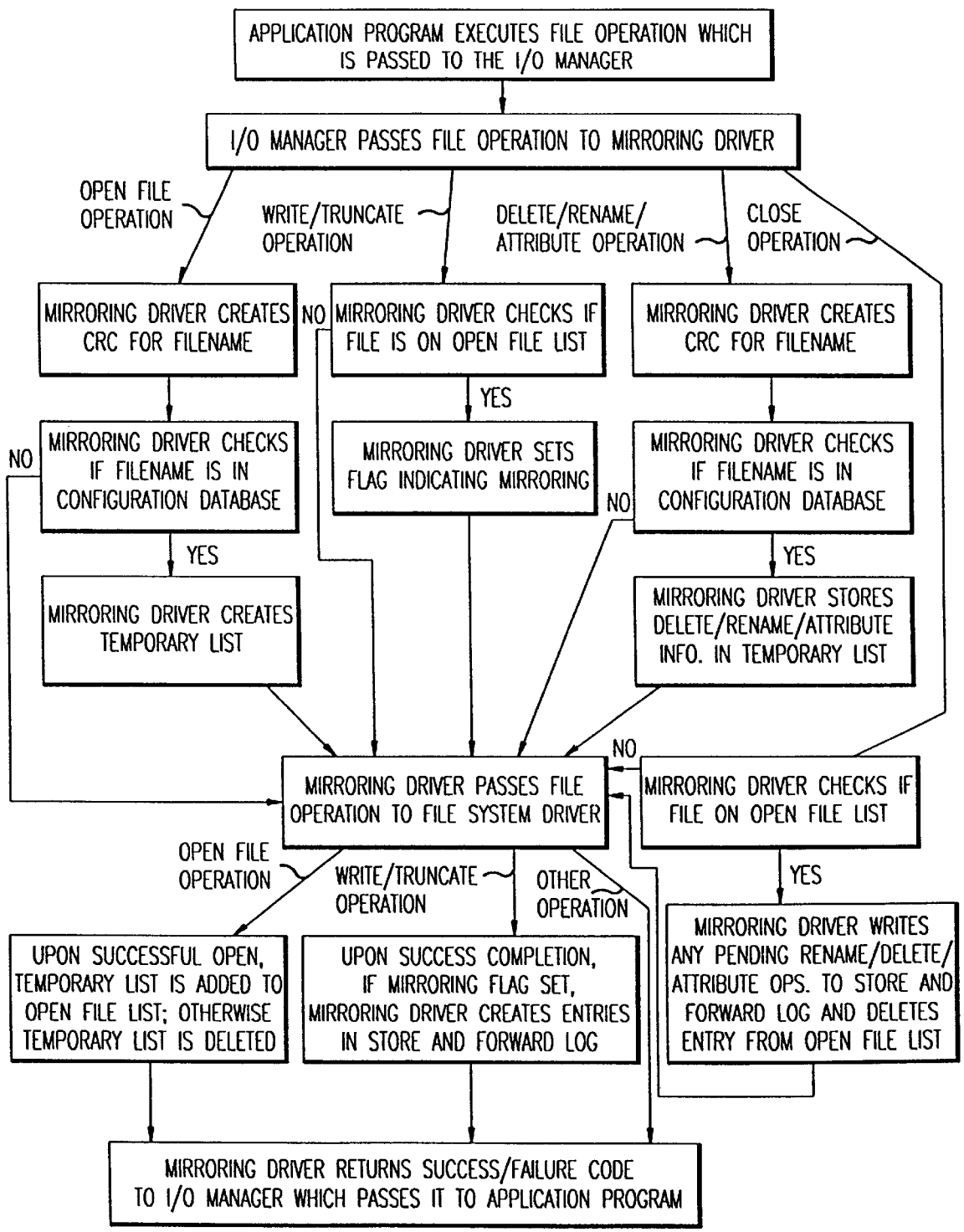
FIG. 4b is a flow chart illustrating the operation of the write intercept and store function.

The write intercept and store function is illustrated in FIGS. 4a and 4b.

After the system has been started, file operations executed by application program 41 are passed to the input-output (I/O) manager 42 of the local computer system. I/O manager 42 passes the file operation to mirroring driver 43, which in turn passes the file operation to file system driver 44.

I/O manager 42 and file system driver 44 are standard operating system functions and are well known in the art. Mirroring driver 43 is attached to file system driver 44 using, for example, the IoAttachDevice call of Windows NT. In this way, the mirroring function can be implemented without requiring recompilation of application or operating system programs.

When a file open or create operation is passed to mirroring driver 43, mirroring driver 43 searches driver configuration table 49 to determine if the file is to be mirrored. Mirroring driver 43 first creates a CRC for the filename of the file being opened. If the configuration database entry is for a fixed filename, then the CRC is compared to the entry's CRC. If a match is found, then the name of the file being opened is compared to the source filename in the entry as a check in case two filenames have the same CRC. Once a fixed filename has been found, no other fixed filenames are searched for.

If the configuration database entry is for a wildcarded filename, a subtree, or a subtree including a wildcarded filename, the length of the filename of the file being opened is compared to the length of the fixed (or non-wildcarded) portion of the entry's source filename. If the length of the filename of the file being opened is less than the length of the fixed portion of the entry's filename, checking for this entry stops, since the entry could not possibly match the file to be opened. Otherwise, the fixed portion of the entry's source filename is compared to the initial portion of the filename. If a match occurs, the remaining portion of the filename is compared to the wildcarded portion, if any, of the entry's source filename.

If the filename of the file being opened matches any entries in driver configuration table 49, mirroring driver 43 stores the following information in an entry in a temporary list: the file object pointer (which uniquely identifies the file); a sublist having, for each matched driver configuration table entry, a pointer to the driver configuration table entry and the part of the filename that matches the non-fixed portion, if any, of the driver configuration table entry; and the operation performed on the file (in this case, Open). Mirroring driver 43 then passes the open operation to file system driver 44. If the open operation completes successfully, the temporary list is added to Open File List 46; otherwise, the temporary list is deleted. Open File List 46 contains only one entry for each opened file and the entry points to all of the corresponding entries in driver configuration table 49.

When a write or truncate operation is passed to the mirroring driver 43, mirroring driver 43 checks the file object pointer to see if it is in Open File List 46. If it is, the mirroring driver 43 sets a flag indicating that mirroring is necessary upon successful completion of the I/O operation. Mirroring driver 43 then passes the I/O operation to file system driver 44. File system driver 44 attempts to perform the I/O operation and, if successful, returns a success code to mirroring driver 43.

Figure 7:
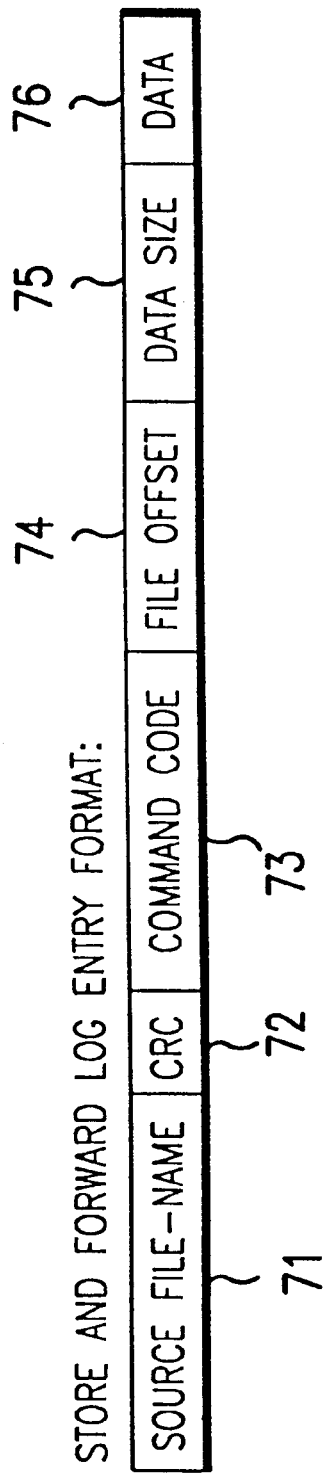
FIG. 7 illustrates a preferred format of an entry in the Store and Forward Log.

If mirroring driver 43 receives a success code from file system driver 44 and the mirroring flag is set, mirroring driver 43 creates one or more entries in store and Forward Log 47. As illustrated in FIG. 7, each entry in store and Forward Log 47 comprises a source filename field 71, a CRC field 72, a command code field 73, a file offset field 74, a data size field 75, and a data field 76.

A store and Forward Log entry is created for each configuration database entry corresponding to a file object in Open File List 46. source filename field 71 contains the source filename specified in the driver configuration table entry followed by the part of the filename that matches the non-fixed portion (if any). CRC field 72 is set to be the same as the corresponding field in the driver configuration table entry. Command field 73 designates the action to be performed on the file (e.g., write data). File offset field 74 is set to the offset in the mirrored file at which data was written, and data size field 75 is set to the size of the data written. Lastly, data field 76 contains a copy of the data that was written to the file. Preferably, a new Store and Forward Log is created when the current Store and Forward Log reaches a predetermined maximum file size.

After creating an entry in Store and Forward Log 47, mirroring driver 43 returns a success code to I/O Manager 42 which in turn passes it to Application Process 41.

File operations, such as delete, rename and change of attribute, are also processed by mirroring driver 43. For delete and change of attribute operations, the file is searched for in driver configuration table 49, as above. If a matching entry is found in driver configuration table 49 and the operation is successful on the local computer system, mirroring driver 43 creates an entry in Open File list 46, again as above. In this case, command field 74 is filled with delete or change of attribute information. For rename operations, mirroring driver 43 searches driver configuration table 49 for both the source and target name (where the rename operation renames the file from source name to target name). If the rename operation is successful on the local computer system and a matching entry is found in driver configuration table 49 for the source name, mirroring driver 43 creates an entry in Open File list 46 with command field 74 set to delete. Also, if the rename operation is successful and a matching entry is found in driver configuration table 49 for the target file name, mirroring driver 43 creates an entry in Open File list 46 with command field 74 set to copy. A command field set to copy indicates the file is to be copied to the remote computer system or systems.

When a file is closed, the mirroring driver 43 checks Open File List 46 for the file object being closed. If the file is found, mirroring driver 43 further checks whether the file has any pending delete, copy or attribute operations and, if so, writes the delete/copy/attribute information to Store and Forward Logs 47 with command field 74 set to the command in the Open File List entry and the offset, size and data fields set to empty. Lastly, mirroring driver 43 removes the file's entry from the Open File List 46.

Write Forward and Confirm

Figure 5:
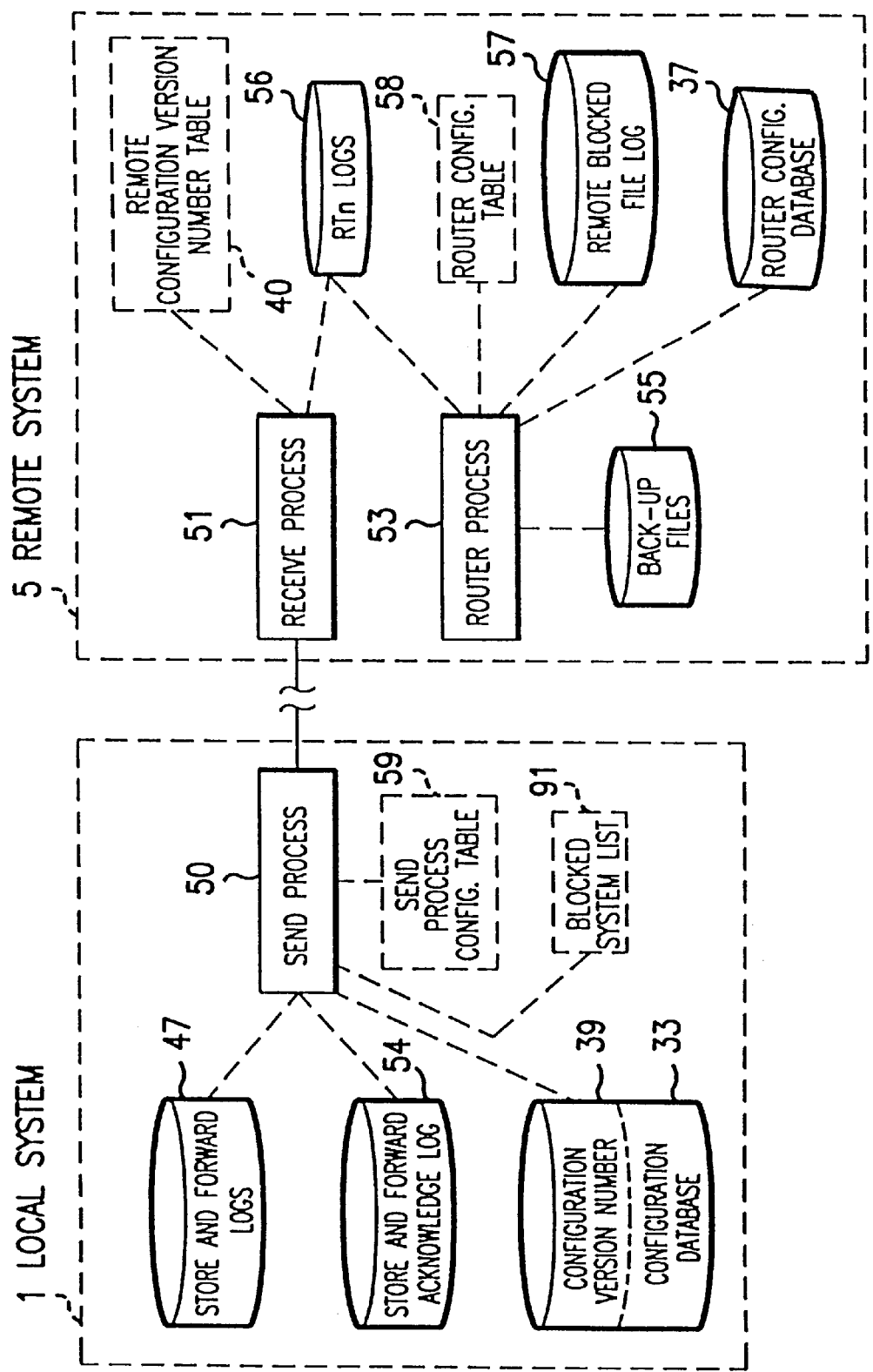
FIG. 5 is a block diagram illustrating the components of the write forward and confirm function.

The actual mirroring of data at the remote destination site (i.e., the write forward and confirm function) is illustrated in FIG. 5. Send process 50 executes on local computer system 1 and is responsible for forwarding write operations across network 4 to receive process 51 on remote computer systems 5.

Send process 50 executes in the background (i.e., asynchronously from other software on the local computer system) and periodically reads Store and Forward Logs 47. Preferably, send process 50 reads Store and Forward Logs 47 every tenth of a second or immediately if the previous read found new data to be forwarded.

At startup, send process 50 reads configuration database 33 and builds send process configuration table 59 in memory. Send process configuration table 59 basically contains essentially the same information as configuration database 33. Each entry contains the source file, destination site, destination file, attribute and delete suffix information of a corresponding entry in the configuration database 33. In addition, a CRC based on the source file is associated with each entry.

Figure 8:
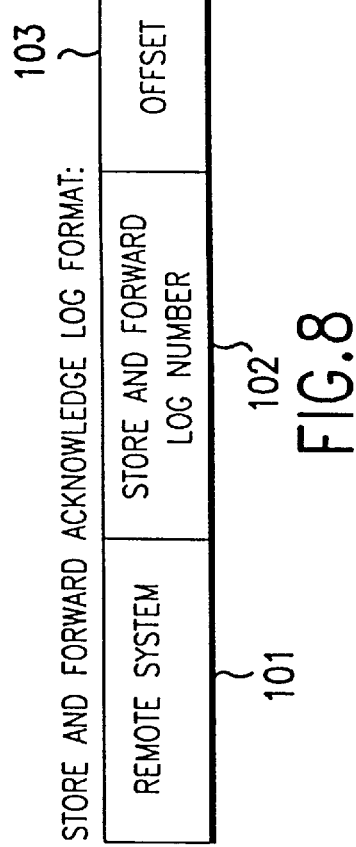
FIG. 8 illustrates a preferred format of an entry in the Store and Forward Acknowledge Log.

Send process 50 locates new I/O requests in the Store and Forward Logs 47 in two ways. At start-up and when a remote computer system becomes unblocked (described in more detail below), the send process 50 reads the Store and Forward Acknowledge (SFA) Log 54. SFA Log 54 contains an entry for each remote computer system that is to receive mirrored data. As shown in FIG. 8, each entry in SFA Log 54 comprises a remote computer system field 101 indicating the name of the remote computer system, a Store and Forward Log number field 102 indicating the Store and Forward Log containing the last entry that the remote computer system acknowledged receiving, and an offset field 103 indicating the offset of that last entry in the designated Store and Forward Log sent to the remote computer system. With the information in SFA Log 54, send process 50 can send all pending unacknowledged I/O requests to each unblocked remote computer system.

Alternatively, during normal operation, send process 50 maintains a pointer for each Store and Forward Log 47 to the last entry sent. Since send process 50 processes the entries in each Store and Forward Log 47 in first-in, first-out order, any entry in a Store and Forward Log after the last entry sent is new.

Once send process 50 locates a Store and Forward Log entry to send, send process 50 extracts the source filename and CRC information from the entry. Send process 50 then scans the entire send process configuration table 59 and locates the entry with the matching CRC, preferably using a binary tree search algorithm. If the command code in the Store and Forward Log entry is other than a copy command (which is discussed below), send process 50 then sends the source file, CRC, command code, offset, size and data fields of the Store and Forward Log entry, along with the current configuration version number 39, to the destination site specified in the send process configuration table entry. As described above, configuration version number 39 designates the current version of the configuration database and is incremented each time the configuration database is updated. Configuration version number 39 is also incremented each time send process so is restarted.

On the remote computer system, receive process 51 receives the information sent by send process 50 and Stores it in a pair of router log files (RT1, RT2) 56. The receive process 51 first checks whether the configuration version number sent by send process 50 matches the configuration version number Stored in remote configuration version number table 40. If the version numbers do not match, the remote computer system's router configuration database 37 is not up-to-date. In this case, receive process 51 will return an error code that instructs send process 50 to send the current configuration information. Configuration version number table 40 is stored in memory and is cleared each time the remote computer system is restarted.

Figure 10:
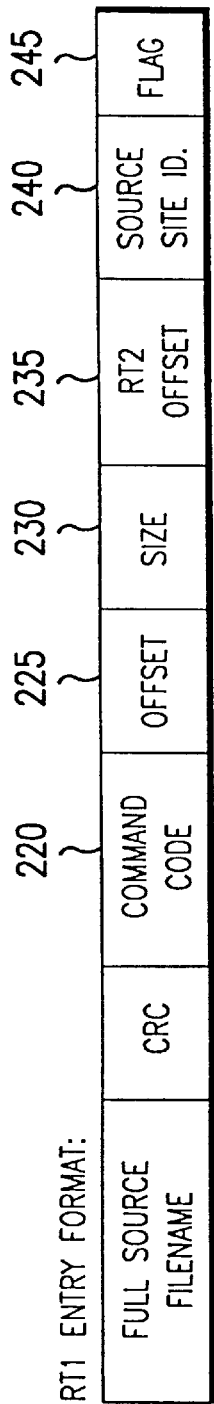
FIG. 10 illustrates a preferred format of an entry in an RT1 file.

If the configuration version numbers match, an RT1 and RT2 entry are created. As shown in FIG. 10, each RT1 entry comprises the following fields: full source filename 210, CRC 215, command code 220, back-up file offset 225, size 230, RT2 data offset 235, source site ID 240 and flag 245. The first five fields contain the information received from the local computer system. RT2 data offset information 235 indicates the offset of the data in the corresponding RT2 file. source site ID 240 indicates the source machine that sent the request and flag 245 indicates whether execution of the operation designated in the entry is complete. The RT2 entry contains the raw data received from the local computer system.

If receive process 51 successfully writes the information to RT1 and RT2, receive process 51 sends an acknowledgement to the source machine. After receiving the acknowledgement, send process 50 marks the entry in Store and Forward Log 47 as complete and updates SFA Log 54. When all entries in a Store and Forward Log are marked complete, the log can be closed. If the writes to RT1 and RT2 are unsuccessful, receive process 51 returns an error code. Preferably, a maximum size can be set for RT1 and RT2 files. If either router log file (RT1 or RT2) is at its maximum, receive process 51 will open a new pair of log files (e.g., RT1.00n and RT2.00n).

Router process 53 is responsible for applying the file update information to back-up files 55. At startup, router process 53 reads Router Configuration database 37 into the router configuration table 58.

Each RT1 file has a flag indicating whether it contains non-completed entries and the oldest RT1 file is processed first. Router process 53 reads an entry from the RT1 file and checks if the entry is marked as complete. If the entry is not complete, router process 53 checks blocked file log 57 (discussed below) to see if the entry is for a file which is blocked. If the file is blocked, router process 53 skips the entry and reads the next entry.

If the file is not blocked, router process 53 searches Router Configuration database 37, using the CRC and source filename information, to determine which back-up file the file operation should be applied to. Router process 53 then checks if the back-up file is open and, if not, opens it. Router process 53 also creates the file, as well as any necessary directories, if the file does not exist. If ten files are already open, the least recently used open file is closed before opening the current back-up file. Router process 53 then applies the file operation to the back-up file and marks the entry in the RT1 file as 'complete'. If all entries in the RT1 file are complete, then router process 53 sets the file flag to 'file complete' and opens the next pair of router log files.

Copy Processing and Synchronization

If an entry in the Store and Forward Log 47 has command field 73 set to copy, send process 50 copies the file indicated in source filename 71 to the destination site(s) indicated in the matching entry for source filename 71 in send process configuration table 59. The copying is accomplished by simulating data writes that recreate the mirrored file and having the mirroring system of the present invention, described above, automatically create and/or rewrite the back-up file. If source filename 71 specifies a directory subtree, then all files in the directory subtree are copied to the destination site(s).

A user can also initiate copying of files from the source machine to remote machines through a synchronize command. This is typically done after adding existing files to configuration database 33 or when mirrored files and back-up files need to be re-synchronized. As shown in FIG. 4a, server process 32 processes the synchronize command by placing entries in Store and Forward Log 47, indicating that the specified files or directories are to be copied. Send process 50 then copies the files to the remote computer system or systems, as described above.

Blocking

Referring again to FIG. 5, if write requests cannot be sent to a remote computer system, because, for example, the network is malfunctioning, send process 50 adds the site to blocked site list 91 and notifies users on the local computer system that mirroring to the remote site is not concurrently occurring. Users can then decide whether to continue working on data files having back-up files on the remote computer system. If a user continues to work, write requests will be Stored in the Store and Forward Log and the back-up files will be updated when the communications link is re-established.

The unblock command checks whether a blocked site has become unblocked (i.e., whether communications can be re-established with the remote computer system). If communications can be re-established, the unblock command informs send process 50, which in turn closes the current Store and Forward Log 47, opens the oldest Store and Forward Log 47 having entries for the site is unblocked and marks the entry for the site in blocked site list 91 as unblocked. Send process 50 then. continues with normal processing. The unblock command is preferably automatically executed periodically (e.g., every five minutes) and also manually executable by the user at any time.

Blocking also occurs on remote computer systems when router process 53 detects that it cannot write to a back-up file. Router process 53 adds the router configuration table entry and the name of the router log file containing the blocked operation to remote blocked file log 57. Again an unblock command is automatically executed periodically or can be manually executed by a user.

When a file is unblocked, router process 53 marks the router configuration entry for the file in blocked file log 57 as unblocked. Router process 53 then closes the current RT1 and RT2 log files and opens the pair that were open when the file was blocked.

In addition to the above-described software and data files, one of skill in the art will appreciate that it is generally useful to maintain error log files on the local and remote computer systems for storing errors occurring during the operation of the system.

Server and Remote Server Start-up

When server process 32 is executed on the local computer system, server process 32 starts mirroring driver 43, if not already started, and identifies for mirroring driver 43 the current Store and Forward Log 47. Server process 32 also starts send process 50 if mirroring is on. In addition, server process 32 sets up an interface (e.g., an RPC interface) for communicating with client configuration process 31.

On each remote machine, remote server process 35 likewise starts and manages receive process 51 and router process 53.

A single computer system can act as both a local computer system and a remote computer system simultaneously, in which case all the processes and functions described above will be present on the single computer system.

In this disclosure, there is shown and described only the preferred embodiments of the invention. It is to be understood that the invention is not limited to the particulars disclosed and extends to all equivalents included within the scope of the claims.

What is claimed is:

1. A data protection system for backing up at least some data files residing on a local computer system, the data protection system comprising:

a local computer system containing one or more data files residing in a file system, wherein the one or more data files are accessed by at least one application program having no data protection code, the local computer system including:
a configuration database indicating which of the one or more data files are to be mirrored; and
a mirroring driver that:
intercepts change information initiated by the at least one application program, the change information representing a change to a selected file; and
compares information identifying the selected file with the configuration database to determine whether the configuration database specifies that the selected data file is to be mirrored; and
a remote computer system in communication with the local computer system, wherein the remote computer system:
receives from the local computer system the change information when it has been determined by the mirroring driver that the selected data file associated with the change information is to be mirrored; and
applies the change information to a backup copy of the selected data file, such that the selected data file is mirrored at the remote computer system.

2. The system of claim 1 wherein the change is a write operation.

3. The system of claim 1 wherein the change is a file operation.

4. The system of claim 1 wherein the change information is received by the remote computer system substantially concurrently with the time the change is made to the selected file on the local computer system.

5. The system of claim 1 wherein the local computer system further comprises a log file in which the change information is Stored before being transmitted to the remote computer system.

6. The system of claim 5, wherein the mirroring driver is attached to a file system driver which captures the change information and stores the change information in the log file.

7. The system of claim 5 wherein the remote computer system transmits an acknowledgement message to the local computer system after receiving the change information.

8. The system of claim 1, wherein the local computer system further comprises:
one or more workstations;
a network server; and
a local area network connecting the workstations and the network server.

9. The system of claim 1 wherein the local computer system and remote computer system are the same system and wherein transmitting information between the local computer system and the remote computer system across the network is accomplished by using a network interface.

10. In a local computer system having a file system for storing data in data files, a method of mirroring a data file to a remote computer system in communication with the local computer system, the method comprising the acts of:
maintaining at the local computer system a configuration database that specifies data files of the local computer system that are to be mirrored to the remote computer system;
a mirroring driver of the local computer system intercepting an operation on a selected data file associated with the file system performed by an application program executing on the local computer system, the operation representing a change to the selected data file;
the mirroring driver comparing information identifying the selected data file with the configuration database and determining that the configuration database specifies that the selected data file is to be mirrored to the remote computer system;
transmitting the operation to a file system driver of the local computer system, wherein the file system driver performs the operation on the selected data file, thereby modifying the selected data file; and
based on the determination that the configuration database specifies that the selected data file is to be mirrored to the remote computer system, transmitting information regarding the operation from the local computer system to the remote computer system by the mirroring driver, thereby enabling the remote computer system to perform the operation on a backup copy of the selected data file at the remote computer system, such that the selected data file is mirrored at the remote computer system.

11. The method of claim 10 wherein the operation on the selected data file is a write operation.

12. The method of claim 10 wherein the operation on the selected data file is a file operation.

13. The method of claim 10 wherein the act of transmitting occurs substantially concurrently with the operation on the selected data file.

14. The method of claim 10 further comprising an act of storing the information regarding the operation in a log file before transmitting the information to the remote computer system.

15. The method of claim 14 further comprising an act of transmitting an acknowledgement message from the remote computer system to the local computer system after the remote computer system receives the information regarding the operation.

16. A data protection system comprising:
a local computer system containing one or more data files, which are accessed by at least one application program having no data protection code through a file system driver;
a remote computer system for storing back-up copies of one or more selected data files included in the one or more data files, wherein the one or more selected files are referenced in a configuration database and wherein each of the back-up copies corresponds to one of the one or more selected data files;
a network connecting the local system and the remote computer system;
a mirroring driver associated with the local computer system for intercepting an operation performed by the at least one application program on a file included in the one or more data files, wherein the operation changes the file;
means for transmitting information regarding each intercepted operation from the local computer system across the network to the remote computer system if the file is included in the one or more files referenced in the configuration database; and
means associated with the remote computer system for updating a back-up copy corresponding to the file based on the transmitted information.

17. The system of claim 16, wherein the mirroring driver an operation and the means for transmitting information regarding an intercepted operation operate substantially concurrently.

* * * * *

UNITED STATES PATENT AND TRADEMARK OFFICE
CERTIFICATE OF CORRECTION

PATENT NO.     : 6,308,283 B1  
DATED          : October 23, 2001  
INVENTOR(S)    : Kenneth J. Galipeau, Winston Edward Lee Page 1 of 1

It is certified that error appears in the above-identified patent and that said Letters Patent is hereby corrected as shown below:

Column 1,  
Line 63, change "one" to -- One --

Column 2,  
Line 45, delete -- . -- after the word "remote"

Column 6,  
Lines 60, 61 and 65, change "store" to -- Store --  
Line 67, change "source" to -- Source --

Column 8,  
Line 44, change "so" to -- 50 --  
Line 46, change "Stores" to -- stores --  
Line 50, change "Stored" to -- stored --

Column 10,  
Line 7, change "Stored" to -- stored --  
Line 18, delete -- . -- after the word "then"

Column 11, claim 5  
Line 33, change "Stored" to -- stored --

Signed and Sealed this

Second Day of April, 2002

Attest:

Attesting Officer

JAMES E. ROGAN  
Director of the United States Patent and Trademark Office